United States Patent [19]

Box

[11] 4,006,483
[45] Feb. 1, 1977

[54] RECORDING CHART

[76] Inventor: Harold Eugene Box, P.O. Box 782, Liberal, Kans. 76901

[22] Filed: Aug. 18, 1975

[21] Appl. No.: 605,610

[52] U.S. Cl. .............................. 346/77 R; 106/300; 346/135

[51] Int. Cl.² ........................................ G01D 15/34

[58] Field of Search .......... 346/77 R, 135, 33 WL, 346/33 TP, 1; 73/391, 300; 106/300

[56] References Cited

UNITED STATES PATENTS

| 1,861,697 | 6/1932 | Hickok et al. ................... 346/77 R |
| 2,157,445 | 5/1939 | Wichart ........................ 346/135 X |
| 3,808,601 | 4/1974 | Kolb et al. ..................... 346/33 TP |

*Primary Examiner*—Joseph W. Hartary
*Attorney, Agent, or Firm*—Laney, Dougherty, Hessin & Fish

[57] ABSTRACT

The present invention relates to a high temperature resistant chart for use in bottom hole pressure recording devices and the like whereby scores representing recordings are inscribed on the chart. The chart is comprised of a flat dark-colored flexible sheet having a uniform layer of light-colored high temperature resistant paint composition applied to one side thereof so that scores inscribed thereon are dark-colored in a light-colored background.

2 Claims, 3 Drawing Figures

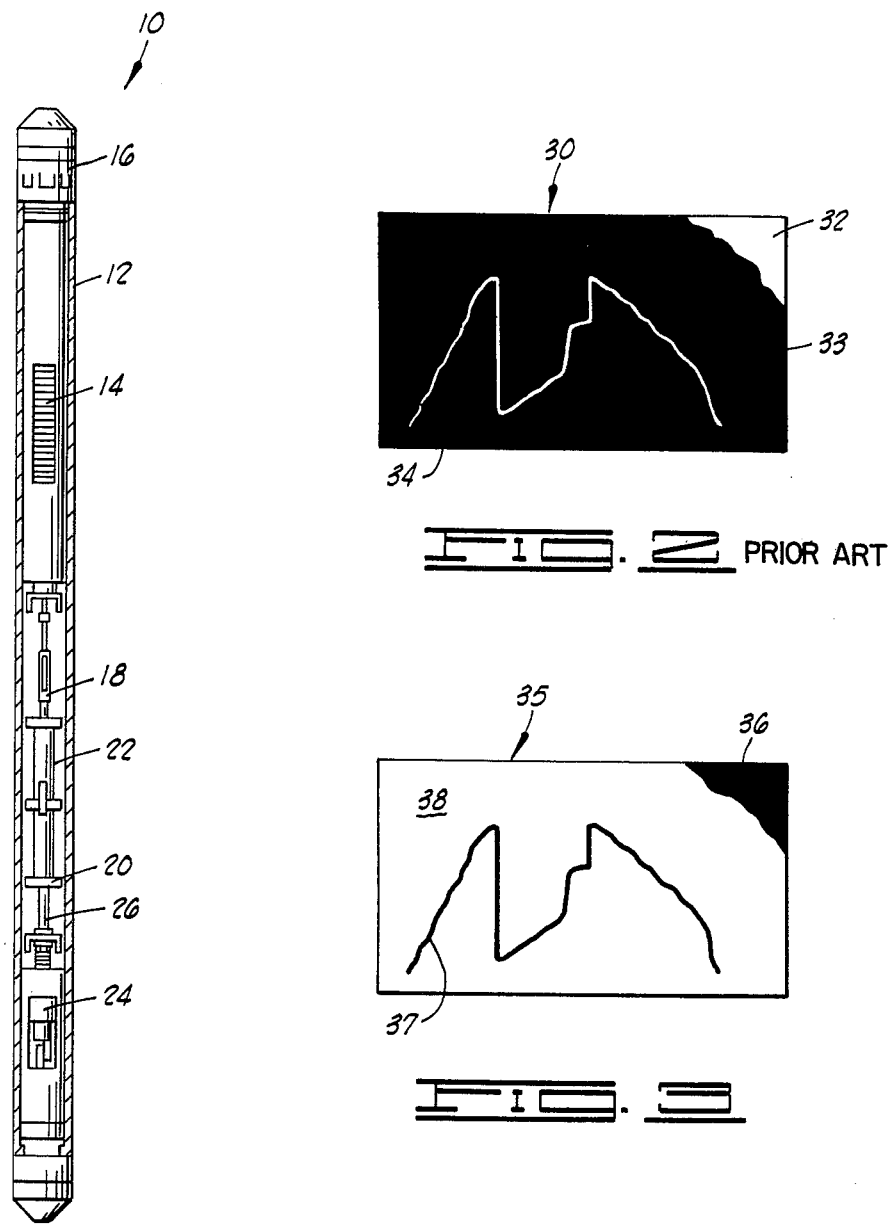

RECORDING CHART

BACKGROUND OF THE INVENTION

1. Field of the Invention

The present invention relates generally to recording charts of the type wherein scores are inscribed thereon, and more particularly, but not by way of limitation, to recording charts of the type used in oil and gas well bottom hole pressure testing apparatus.

2. Description of the Prior Art

Apparatus for testing various conditions in oil and gas well bores, i.e., drill stem testing apparatus, commonly include charts formed of metal or other material for recording pressure and other conditions in the well bore. Scores representing a recording of the particular condition tested are inscribed on the chart by a marking stylus. For example, bottom hole pressure recording devices are commonly utilized to record pressures in a formation penetrated by a well bore during testing of the formation. The pressure recordings are made on a metal chart by a marking stylus attached to the end of a bourdon tube positioned in the device. Pressure is transmitted through a rubber diaphragm to fluid contained within the bourdon tube causing the stylus attached thereto to be moved on the chart. The chart is driven past the stylus by a clock thereby recording pressure versus time on the chart.

Heretofore, the charts utilized in bottom hole pressure recording devices and the like have been formed of brass coated with a dark coating so that scores inscribed on the chart by the marking stylus of the recording apparatus penetrate through the black coating and form light-colored markings in a black background on the chart. While such charts can be readily utilized to determine the recorded information, copies of such charts using conventional photocopying equipment are generally unsatisfactory due to the dark-colored background and light-colored markings. Consequently, heretofore, it has been necessary to photograph the original metal chart, produce a negative having the light and dark colors reversed and make copies from the negative.

While attempts have been made heretofore to produce charts for use with drill stem testing apparatus which when scored by a marking stylus produce dark markings on a white background, such charts have largely been unsuccessful due to the high temperatures to which the chart is exposed while bottom hole tests are being conducted. By the present invention, a high temperature resistant recording chart and method of manufacturing such chart are provided wherein scores inscribed on the chart produce dark markings in a white background so that conventional photocopies of the chart and recordings thereon can be readily made.

SUMMARY OF THE INVENTION

The present invention is directed to a chart for use with a device having a marking stylus for inscribing scores representing recordings on the chart comprising a flat dark-colored flexible sheet of a size and shape adapted to be installed in the device, one side of the sheet having a uniform layer of light-colored high temperature resistant paint composition applied thereto so that the marking stylus inscribes dark-colored scores in a light-colored background on the chart. Methods of manufacturing the chart are also provided.

It is, therefore, a general object of the present invention to provide an improved score recording chart.

A further object of the present invention is the provision of a chart for use with bottom hole pressure testing apparatus and the like which produces dark markings in a light background when scored by a marking stylus.

Yet a further object of the present invention is the provision of methods of manufacturing a high temperature resistant score recording chart which produces dark-colored markings in a light-colored background when scored by a marking stylus.

Other and further objects, features and advantages of the present invention will be readily apparent to those skilled in the art upon a reading of the description of preferred embodiments which follows when taken in conjunction with the accompanying drawings.

BRIEF DESCRIPTION OF THE DRAWINGS

FIG. 1 is a side elevational view of a conventional bottom hole pressure recording apparatus with portions thereof cutaway;

FIG. 2 is an illustration of a conventional recording chart after bottom hole pressure information has been recorded thereon;

FIG. 3 is an illustration of the improved recording chart of the present invention after bottom hole pressure information has been recorded thereon.

DESCRIPTION OF PREFERRED EMBODIMENTS

Referring now to the drawings and particularly to FIG. 1, a conventional bottom hole pressure recording device is illustrated and generally designated by the numeral 10. The apparatus 10 basically comprises an elongated cylindrical housing 12 having a pressure sensing element (bourdon tube) 14 disposed in the upper portion thereof. The bourdon tube 14 is filled with fluid which is communicated to the inside of a rubber diaphragm (not shown) connected to the upper end thereof. Pressure is transmitted through the housing 12 of the apparatus 10 to the rubber diaphragm by way of openings 16 disposed in the housing 12. Increases in pressure cause the bourdon tube to uncoil moving the lower end thereof axially within the housing 12. A marking stylus 18 is connected by means of suitable linkage 20 to the lower end of the bourdon tube 14. A chart reel or spool 22 is provided adjacent the stylus 20 which is rotated by a clock 24 attached thereto by means of suitable linkage 26.

As is well understood by those skilled in the art, a chart formed of thin flexible metal is positioned on the spool 22 in contact with the stylus 20 so that scores are inscribed on the chart by the stylus 20 corresponding to the movement of the bourdon tube 14 caused by changes in pressure exerted thereon and rotational movement of the chart past the stylus at a constant rate by the clock 24.

Referring now to FIG. 2, a chart of the type used heretofore is illustrated and generally designated by the numeral 30. As indicated above, such charts are generally formed of brass sheets 32 and include a black coating 33 so that the scores 34 inscribed on the chart by a marking stylus are light-colored in a dark-colored background. That is, as shown in FIG. 2, the scores 34 inscribed on the chart 30 by the marking stylus remove portions of the black coating so that the recorded information appears in the form of light-colored lines on a dark-colored background. As further mentioned above, this type of chart generally cannot be reproduced using conventional photocopying equipment without first photographing the chart and producing a negative having the light-colored and dark-colored areas reversed, which procedure is time-consuming and expensive.

By the present invention a chart 35 is provided wherein scores 37 inscribed on the chart appear as black lines on a white background as illustrated in FIG. 3. The chart 35 is comprised of a flat dark-colored sheet 36 formed of flexible material such as metal, plastic material and other material which is resistant to high temperatures and includes a uniform layer of hardened light-colored high temperature resistant paint composition 38 adhered to one side thereof. The layer of composition 38 is of a thickness such that when scores are inscribed on the chart, portions of the composition are removed forming dark-colored lines in a light-colored background. As will be apparent, the chart of the present invention can be readily copied using conventional photocopying equipment without the necessity of photographing the original chart and producing a negative thereof.

If the material from which the flexible sheet 36 is formed is not of a dark color, a first layer of a dark-colored high temperature resistant paint composition can be applied to the material followed by the layer of light-colored high temperature resistant paint composition 38. Preferably, the flexible material and/or the layer of dark-colored composition is black and the layer of light-colored composition is white. However, as will be understood, as long as the flexible material or dark-colored paint composition layer is relatively dark as compared to the light-colored outer layer of paint composition 38, satisfactory results are achieved.

A particularly suitable light-colored paint composition which can be used in accordance with the present invention, i.e., a paint which is high temperature resistant and readily removable by a conventional marking stylus is comprised of titanium dioxide present in the composition in an amount of about 9.2% by weight, magnesium silicate present in the composition in an amount of about 9.2% by weight, silicone resin present in the composition in an amount of about 9.2% by weight and a hydrogen liquid solvent or base present in the composition in an amount of about 72.4% by weight.

In manufacturing the improved recording chart of the present invention, the flexible sheet material utilized is first formed into a desired size. If the flexible material is dark-colored or black, the white high temperature resistant paint composition is applied to one side thereof, preferably by spraying the composition on the material and then allowing the composition to cure or harden. The composition is applied to the material in a manner whereby a layer of uniform thickness results which is readily penetrated by a conventional marking stylus so that as the stylus moves over the chart, portions of the layer are removed exposing the dark material below and forming dark-colored lines in a light-colored background on the chart. Preferably, the composition is sprayed onto the chart material and then baked in an oven for 15 minutes at 400° F whereby a dry paint composition thickness of from about 1.0 to about 1.5 mils. results.

If the flexible material utilized is not of dark color, a layer of dark-colored high temperature resistant paint composition can be first applied to one side of the flexible material by spraying the composition thereon. The layer of dark-colored composition can be relatively thick so that the stylus does not remove enough of the dark-colored layer to expose the light-colored flexible material. After applying the dark-colored paint composition to a side of the flexible material, a uniform layer of light-colored high temperature resistant paint composition is applied on top of the dark-colored composition so that a uniform layer of the white composition is produced of a thickness such that the stylus readily removes portions of the white-colored composition exposing the dark-colored composition lying therebeneath and forming dark-colored lines in a light-colored background on the chart.

Because the composition described above readily adheres to surfaces, cures into a hard layer and is high temperature resistant, i.e., does not peel or soften when heated to temperatures up to 1000° F, the recording chart of the present invention can be used successfully with drill string testing tools in high temperature and pressure environments.

Thus, the present invention is well adapted to carry out the objects and attain the ends and advantageous mentioned as well as those inherent therein. While presently preferred embodiments of the invention have been described for purposes of this disclosure, numerous changes in the manufacturing methods and chart structure disclosed will suggest themselves to those skilled in the art, which changes are encompassed within the spirit of this invention as defined by the appended claims.

What is claimed is:
1. A chart for use with a device having a marking stylus for inscribing scores representing recordings on said chart which comprises:
a flat dark-colored flexible sheet of a size and shape adapted to be installed in said device, one side of said sheet having a uniform layer of light-colored high temperature paint composition applied thereto so that said marking stylus inscribes dark-colored scores in a light-colored background on said chart, said light-colored high temperature resistant paint composition being comprised of titanium dioxide present in said composition in an amount of about 9.2% by weight, magnesium silicate present in an amount of about 9.2% by weight, silicone resin present in an amount of about 9.2% by weight and hydrocarbon liquid solvent present in said composition in an amount of about 72.4% by weight.

2. A chart for use with a bottom hole pressure recording device having a marking stylus attached to a pressure sensing element for inscribing scores representing pressure recordings on said chart which comprises:
a flat flexible sheet of a size and shape adapted to be installed in said pressure recording device, one side of said sheet having a first layer of black high temperature resistant paint composition applied thereto and a second layer of white high temperature resistant paint composition overlying said first layer so that said marking stylus removes portions of said white paint composition and inscribes black scores in a white background on said chart, said second layer of paint composition being comprised of titanium dioxide present in said composition in an amount of above 9.2% by weight, magnesium silicate present in an amount of about 9.2% by weight, silicone resin present in an amount of about 9.2% by weight and a hydrocarbon liquid solvent present in said composition in an amount of about 72.4% by weight.

* * * * *